US005089831A

United States Patent [19]

Ito et al.

[11] Patent Number: 5,089,831

[45] Date of Patent: Feb. 18, 1992

[54] BLOCK-DIVIDED DRIVING APPARATUS OF GRADATION THERMAL PRINTHEAD

[75] Inventors: Taichi Ito, Hirakata; Masato Tsukuda, Moriguchi, both of Japan

[73] Assignee: Matsushita Electric Industrial Co., Ltd., Osaka, Japan

[21] Appl. No.: 529,063

[22] Filed: May 25, 1990

[30] Foreign Application Priority Data

May 26, 1989 [JP] Japan .................... 1-133413
Jul. 20, 1989 [JP] Japan .................... 1-187886

[51] Int. Cl.[5] .................... G01D 15/10; G01D 15/16

[52] U.S. Cl. .................... 346/76 PH; 358/298; 400/120

[58] Field of Search .................... 346/76 PH; 358/298; 400/120

[56] References Cited

U.S. PATENT DOCUMENTS

| | | | |
|---|---|---|---|
| 4,586,054 | 4/1986 | Kurita | 346/76 PH |
| 4,639,741 | 1/1987 | Inoue | 346/76 PH |
| 4,712,930 | 12/1987 | Maruno et al. | 346/76 PH |

FOREIGN PATENT DOCUMENTS

| | | |
|---|---|---|
| 0058877 | 4/1985 | Japan . |
| 0144367 | 7/1986 | Japan . |
| 0185462 | 8/1986 | Japan . |
| 61-196662 | 8/1986 | Japan . |
| 0226772 | 10/1986 | Japan . |
| 62-199467 | 9/1987 | Japan . |

*Primary Examiner*—Benjamin R. Fuller
*Assistant Examiner*—Huan Tran
*Attorney, Agent, or Firm*—Panitch Schwarze Jacobs & Nadel

[57] ABSTRACT

A thermal recording apparatus having a thermal head including a plurality of heating element groups each of which consists of a plurality of heating elements driven simultaneously and arranged in a row is so improved that it can record images without forming printing gaps. The apparatus has a driving unit for producing driving signals indicative of tones of the image data of pixels to drive the heating elements. The pixels correspond to the heating elements, respectively. The period of time of driving the heating elements is varied in accordance with the tones. The driving unit comprises a modification circuit for modifying the period of time of driving at least one of the heating elements which is disposed at each of both ends of each of the heating element groups.

8 Claims, 10 Drawing Sheets

BLOCK-DIVIDED DRIVING APPARATUS OF GRADATION THERMAL PRINTHEAD

BACKGROUND OF THE INVENTION

1. Field of the Invention

This invention relates to a thermal recording apparatus which can produce images having precisely multiple tones (hereinafter, abbreviated as "multitone").

2. Description of the Prior Art

In recent years, thermal recording apparatuses have advanced with respect to full-color and high-speed recording, but high-precision multitone recordings have been in demand so as to obtain good half-tone recorded images.

FIG. 6 shows a thermal recording apparatus. The apparatus of FIG. 6 comprises a thermal head 1 having a plurality of heating element groups 1R which are arranged in a row, a platen 2, and a thermal transfer ink sheet 3 having a base film 3*a* and thermal transfer ink 3*b* applied thereon. The thermal transfer ink sheet 3 and a paper sheet 4 are inserted between the thermal head 1 and the platen 2. The platen 2 is urged against the thermal head 1 to ensure sufficient contacts between the paper sheet 4 and the thermal ink sheet 3 and also the thermal ink sheet 3 and the heating element groups 1R. FIG. 12 shows the appearance of the thermal head 1.

In the thermal head 1, as shown in FIG. 8, there are N number of the heating element groups $1R_1$-$1R_N$ each consisting of M number of resistors or heating elements $R_1$-$R_M$ which are connected in parallel. The structure of the heating elements $R_1$-$R_M$ is illustrated in FIG. 7A. In each of the heating element groups $1R_1$-$1R_N$, the heating elements $R_1$-$R_M$ elongate along the direction of the broken lines shown in FIG. 7A, and are arranged in the direction perpendicular to the broken lines of FIG. 7A. In other words, the heating elements $R_1$-$R_M$ of all heating element groups $1R_1$-$1R_N$ are arranged in a row. Each of the heating elements $R_1$-$R_M$ has the center portion 1*e* functioning as a heating portion, and two end portions 1*f* functioning as terminals. The heating portion 1*e* becomes wider nearer the terminals 1*f*, and are narrowest at the midpoint between the terminals 1*f*. This configuration results in a low resistance in the heating portion 1*e* and a high resistance at the midpoint between the terminals 1*f*, as shown in FIG. 7B (wherein the horizontal axis is the distance X from one of the end portions 1*f* along the arrow of FIG. 7A, and the vertical axis the resistance R). When a constant voltage is applied to the heating elements $R_1$-$R_M$ for a fixed time period, the amount of heat produced becomes higher as the resistance becomes higher, and therefore the density of the heat produced becomes higher near the midpoint of the heating elements $R_1$-$R_M$. By utilizing this action and varying the time the voltage applied to the heating elements $R_1$-$R_M$, the recorded area per dot or pixel can be freely changed according to the amount of generated heat. This is because the amount of heat generated according to the period of time the voltage is applied to the heating elements $R_1$-$R_M$ concentrates in the midpoint of the heating elements $R_1$-$R_M$, thereby enabling the apparatus to perform multitone recording. The above is disclosed in Japanese Laid-Open Patent Publication (Kokai) No. 60-58,877, 1985.

The heating element groups $1R_1$-$1R_N$ are disposed on one insulating substrate 1S (FIG. 12), and commonly connected at one of the terminals 1*f* to a printer power source (not shown), and the other terminals are respectively connected to output terminals of drive circuits 6 (FIG. 1). The input terminals of the drive circuits 6 are connected to output terminals of latch circuits 7. The input terminals of the latch circuits 7 are in turn coupled to output terminals of shift registers 8. The drive circuits 6 receive in parallel an enable signal supplied from a CPU (not shown) so as to be controlled independently from each other. To the latch circuits 7, a strobe signal is supplied from the CPU, and to the shift registers 8, a clock signal is supplied from a clock generator (not shown).

The input terminal of each of the shift registers 8 is connected to an output terminal of a comparator 11 of a signal circuit unit 5. The signal circuit unit 5 further comprises a RAM 9 and a 12-bit counter 10. The RAM 9 stores multitone data (multiple bits) of pixels of one line to be printed (i.e., multitone data for heating elements $R_1$-$R_M$ of all the groups $1R_1$-$1R_N$). As described in detail later, the output of the counter 10 is supplied to the RAM 9 as address data indicative of the address in the RAM 9 at which multitone data for one heating element is stored, and also to the comparator 11 as threshold data which is to be compared with multitone data supplied from the RAM 9. The comparator 11 outputs sequentially the result of the comparison to the shift registers 8 as print data signals.

The multitone data signals input to the respective shift registers 8 are sent as parallel signals to the corresponding latch circuits 7, the drive circuits 6 are driven by the multitone data signals sent from the latch circuits 7, and the heating elements $R_1$-$R_M$ are energized in accordance with the multitone data signals, whereby thermal recording is performed.

With reference to FIGS. 9, 10 and 11, the operation of the apparatus will be described. In order to simplify the description, it is assumed that the multitone data stored in the RAM 9 are 2-bit data, and that N is 4 and M is 256. That is, the apparatus has four heating element groups $1R_1$-$1R_4$ each of which consists of 256 heating elements $R_1$-$R_{256}$, and each line consists of 1024 pixels (or heating elements).

As shown in FIG. 9, the multitone data corresponding to the one line of 1024 heating elements are stored sequentially from address "0" in the RAM 9. The 256 data stored from address "0" to address "255" correspond to the heating element group $1R_1$, and the next successive groups of 256 data correspond to the heating element groups $1R_2$, $1R_3$ and $1R_4$, respectively. The 5th to 12th bits of the output of the counter 10 are used for designating the 3rd to 10th bits of an address of the RAM 9 (in other words, for designating one of the heating elements $R_1$-$R_{256}$ of one of the heating element groups $1R_1$-$1R_4$). The 1st and 2nd bits of the output of the counter 10 are used for designating the 1st and 2nd bits of an address of the RAM 9 (in other words, for designating one of the heating element groups $1R_1$-$1R_4$. The multitone data stored at the addresses which are designated by the combination of the 1st, 2nd and 5th to 12th bits of the outputs of the counter 10 are supplied sequentially to the comparator 11. The numbers in parentheses in FIG. 9 are decimal representations of the stored values. The 3rd and 4th bits (threshold data) of the output of the counter 10 are input to the comparator 11.

In the comparator 11, the multitone data corresponding to each of the heating elements $R_1$-$R_{256}$ of one heating element group are sequentially compared with the threshold data, and the results are sent sequentially to the shift registers 8. This will be described more specifically. When the threshold data from the counter 10 to the comparator 11 is 0, the multitone data is compared with 0. If the multitone data is 0 or greater, the output of the comparator 11 is "1", and if it is less than 0, the output is "0". Each time 256 multitone data have been compared, the threshold data (3rd and 4th bits) from the counter 10 to the comparator 11 is advanced one by one up to 2 (i.e., from 0 to 1, and from 1 to 2), and the output of the comparator 11 varies as indicated in column C of FIG. 10.

The outputs of the comparator 11 are sequentially input to the shift registers 8, and the outputs of the registers 8 are supplied in parallel to the corresponding latch circuits 7, and then supplied to the driver circuits 6. An enable signal is sent in sequence to select one of the driver circuits 6. One of the driver circuits 6 which receives the enable signal is set to drive the first heating element group 1$R_1$. The outputs of the selected driver circuit 6 have a waveshape as shown in column D of FIG. 10. Each of the heating elements $R_1$–$R_{256}$ of the heating element group 1$R_1$ is driven respectively by the outputs of the selected driver circuit 6 in which the pulse width corresponds to the multitone data stored at the corresponding address of the RAM 9, so that each of the heating elements $R_1$–$R_{256}$ generates heat, the amount of which corresponds to the pulse width. This results in the recorded area per pixel varies in 4 levels, as indicated in column E of FIG. 10, according to the pulse width, whereby the tone of each pixel is controlled in 4 levels.

When the contents of the 1st and 2nd bits of the output of the counter 10 are advanced from 0 to 1, the above-described series of operations are performed against the second heating element group 1$R_2$. In this way, one line is recorded by performing the above-described series of operations sequentially for all the heating element groups 1$R_1$–1$R_4$, and by repeating recording lines while forwarding the paper sheet 4 in the direction of the arrow of FIG. 11, multiple lines are printed to form an image as shown in FIG. 11.

In the configuration described above, since the heating elements are divided into multiple groups which are driven separately, there is sufficient time for the heating elements to cool after heating. However, the heating elements $R_1$ and $R_{256}$ on either end of the heating element groups 1$R_1$–1$R_4$, in each of which the heating elements are driven at the same time, receive thermal interference from adjacent heating elements on only one side. That is, since the radiation of heat generated in the end heating elements $R_1$ and $R_{256}$ to the outside of the group is large, the recorded area per pixel is less than that compared with those recorded by the heating elements $R_2$ to $R_{255}$. Even when all the heating elements $R_1$ to $R_{256}$ are driven by pulses of the same width, resulting in printing gaps G (white lines along the direction of printing (arrow in FIG. 11) on the recording surface of the paper sheet 4. The positions of the printing gaps G correspond to the boundaries between the heating element groups 1$R_1$–1$R_4$. Thus, a conventional thermal printing apparatus has a drawback in that the printing quality is not of a sufficient high quality.

In order to overcome the above-mentioned drawback, an improved method is proposed in Japanese Laid-Open Patent Publication (Kokai) No. 61-224,772, 1986. In this method, heating elements at the both ends of a group of heating elements which are driven at the same time, are driven again immediately after all elements of the group have been driven. This method may be effective in correcting printing gaps in binary tone printing. In multitone printing, however, the period of driving a heating element depends on the recording tone (i.e., low tone: short, high tone: long). Consequently, it is difficult to obtain a good well-balanced correction at all tones in the proposed method.

Another technique is proposed in which heating elements at the ends of a heating element group are different in shape from other heating elements of the group (Japanese Laid-Open Patent Publication (Kokai) Nos. 61-144,367, 1986 and 61-185,462, 1986). In this technique, however, heat generated in each of the end heat elements is always corrected so that it is at a fixed ratio to that generated in the other heating elements, irrespective of tones. As in the above method, therefore, it is difficult to obtain good well-balanced correction at all tones. In order to obtain an optimum shape of end thermal elements for well-balanced printing gap correction in the binary tone printing, moreover, cut and try designs must be repeated.

SUMMARY OF THE INVENTION

The thermal recording apparatus of this invention, which overcomes the above-discussed and numerous other disadvantages and deficiencies of the prior art, comprises a thermal head including a plurality of heating element groups, each of said heating element groups comprising a plurality of heating elements which are driven simultaneously and arranged in a row; and a driving unit for producing driving signals indicative of tones of the image data of pixels to drive said heating elements, said pixels corresponding respectively to said heating elements, the period of time of driving said heating elements being varied in accordance with the tones, and said driving unit comprises a modification means for modifying the driving signals corresponding to at least one of said heating elements which is disposed at each of both ends of each of said heating element groups.

In a preferred embodiment, the degree of modifying said period of time by said modification means depends on the level of the tone of said at least one heating element.

In a preferred embodiment, the resistance of each of said heating elements is gradually decreased toward the directions from the center portion of said heating element to the both ends thereof.

In a preferred embodiment, the driving unit further comprises: first memory means for storing tone data for said heating elements; and address means for producing address data indicative of addresses of said first memory means at which said tone data are stored, and said modification means comprises: second memory means for storing modified tone data corresponding respectively to each of the degrees of tones; and selection means for receiving said address data, and for when said received address data is not indicative of an address of said first memory means corresponding to said at least one heating element, selecting the tone data stored at said address of said first memory means, and, when said received address data is indicative of an address of said first memory means corresponding to said at least one heating element, selecting one of said modified tone data which one corresponds to the tone data stored at the address of said first memory means which is indicated by said address data produced by said address means.

In a preferred embodiment, said second memory means further stores the tone data which are identical with those stored in said first memory means.

In a preferred embodiment, the selection means receives a part of said address data.

In a preferred embodiment, said at least one of said heating elements which is disposed at each of both ends of each of said heating element groups is different in at least one of the shape and dimension from other heating elements.

The thermal recording apparatus of this invention comprises: a thermal head including N number of heating element groups, each of said heating element groups comprising a plurality of heating elements which are driven simultaneously and are arranged in a row; N number of driver circuits for controlling the currents flowing said thermal head; N number of latch circuits disposed in correspondence with said driver circuits; and N number of shift registers disposed in correspondence with said latch circuits, said apparatus further comprises a control unit for supplying signals of printing data to said shift registers, for controlling the period of time of applying said current in accordance with image data per pixel, said pixel corresponding to one of said heating elements, said image data having multiple tone, and for modifying the tone of the image data corresponding to at least one of said heating elements which is disposed at each of both ends of each of said heating element groups.

In a preferred embodiment, said at least one of said heating elements which is disposed at each of both ends of each of said heating element groups is different in at least one of the shape and dimension from other heating elements.

Thus, the invention described herein makes possible the objectives of (1) providing a thermal recording apparatus which is excellent in printing quality; (2) providing a thermal recording apparatus which can print multitone images without forming printing gaps; and (3) providing a thermal recording apparatus which comprises thermal elements having a shape suitable for eliminating printing gaps.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
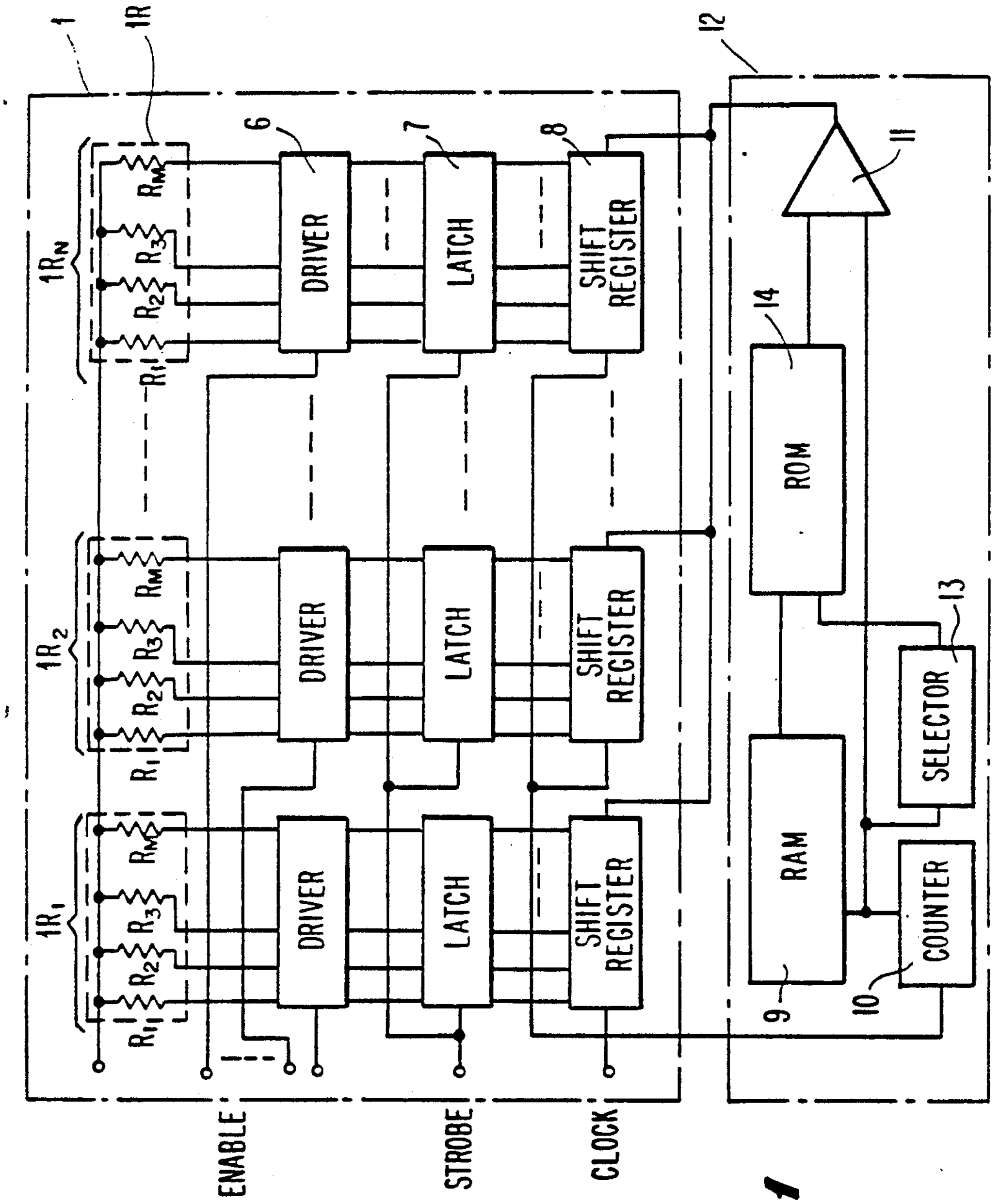
FIG. 1 is a block diagram showing an apparatus according to the invention.
Figure 6:
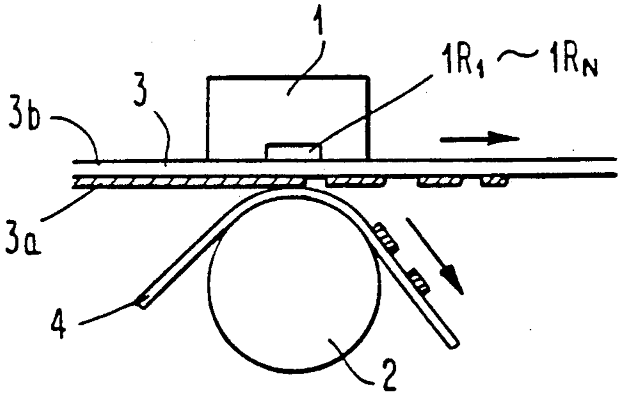
FIG. 6 shows diagrammatically a thermal recording apparatus.
Figure 7A:
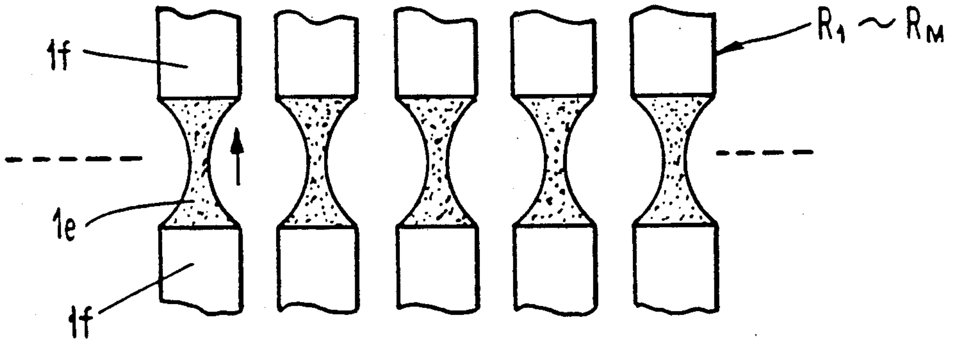
FIG. 7A shows thermal heating elements used in the apparatus of FIG. 6.
Figure 7B:
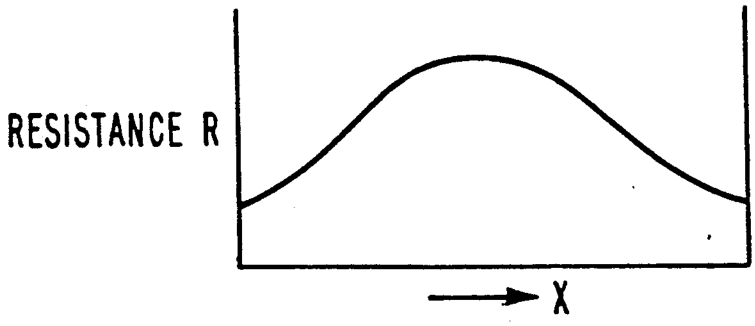
FIG. 7B is a graph showing the variation of resistance in the heating elements of FIG. 7A.
Figure 8:
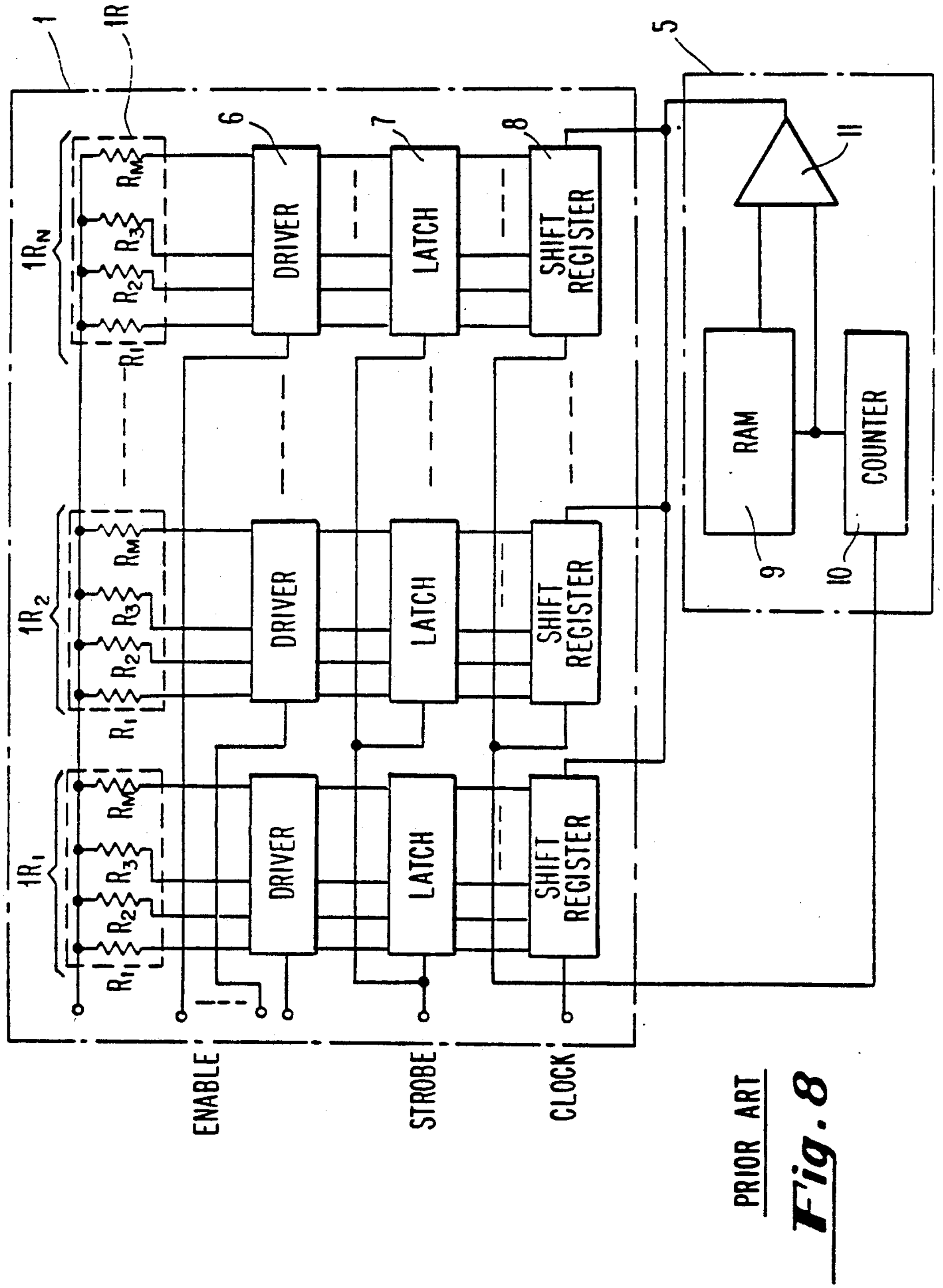
PRIOR ART Fig. 8
FIG. 8 is a block diagram showing a prior art apparatus.
Figure 9:
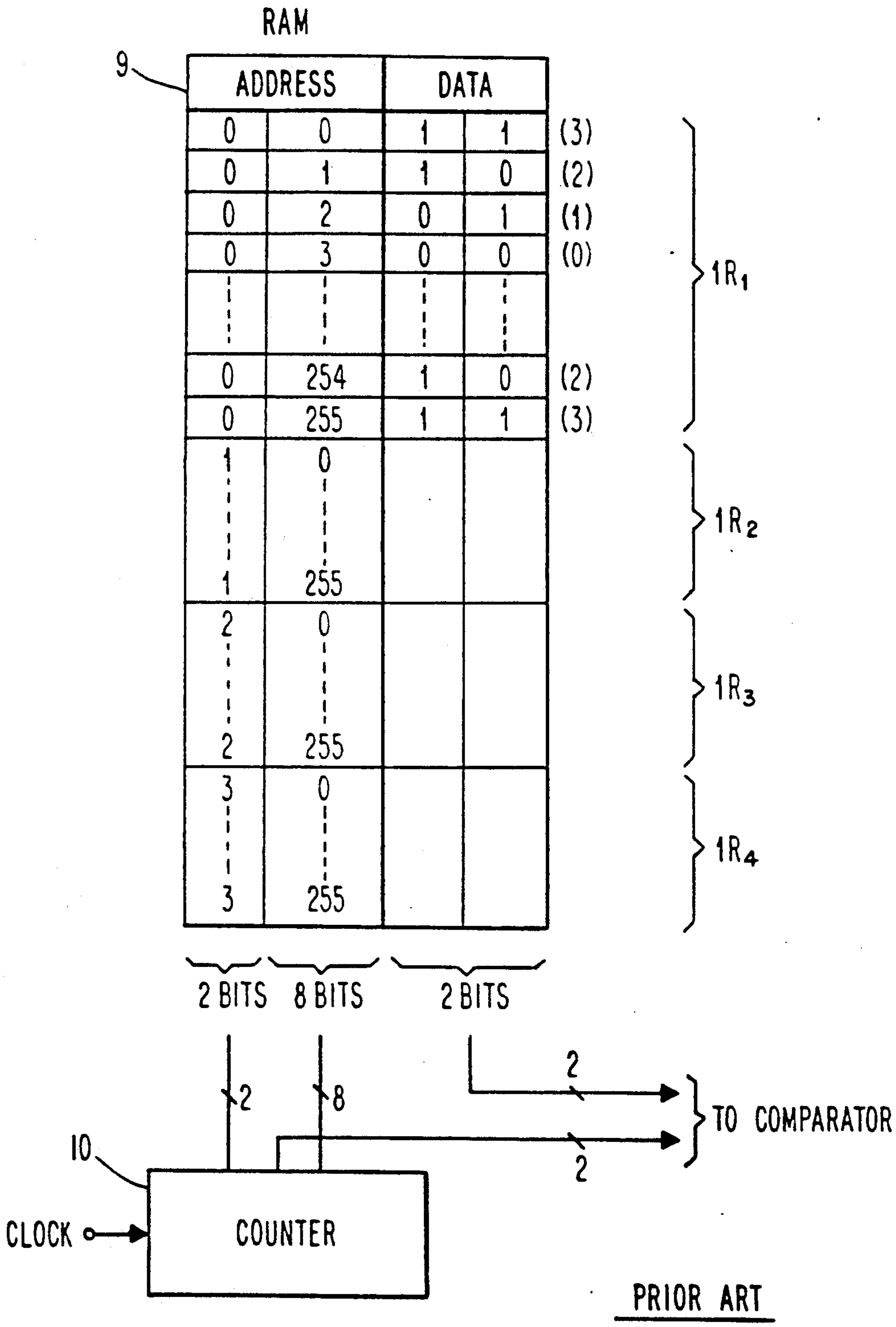
FIG. 9 is a diagram illustrating the operation of the apparatus of FIG. 8.

A thermal recording apparatus according to the invention will be described with reference to the accompanying drawing. FIG. 1 is a block diagram of a thermal head 1 and a signal circuit unit 12. The apparatus according to the invention further comprises a platen 2, and a thermal transfer ink sheet 3 which are constructed substantially in the same manner as those used in the prior art apparatus shown in FIG. 6. The thermal head 1 comprises the same components as the prior art apparatus, and, therefore, their description is omitted. The signal circuit unit 12 comprises a RAM 9, a 12-bit counter 10, a comparator 11, a selector 13, and a ROM 14. The RAM 9 stores multitone data (multiple bits) of pixels of one line to be printed (i.e., multitone data for heating elements $R_1$–$R_M$ of all the groups $1R_1$–$1R_N$). In the embodiment, the output of the counter 10 is supplied to the RAM 9 as address data indicative of the address in the RAM 9 at which multitone data for one heating element is stored, to the comparator 11 as threshold data which is to be compared with multitone data supplied from the RAM 9, and also to the selector 13. The selector 13 outputs a signal of "1" to the 1st bit of the address of the ROM 14 only when the output of the counter 10 indicates either of the both end heating elements $R_1$ and $R_M$. The ROM 14 stores modified tone data for each of the multitones. The comparator 11 compares the output from the ROM 14 with threshold data supplied from the counter 10, and outputs the result of the comparison to the shift registers 8 as print data signals.

Figure 2:
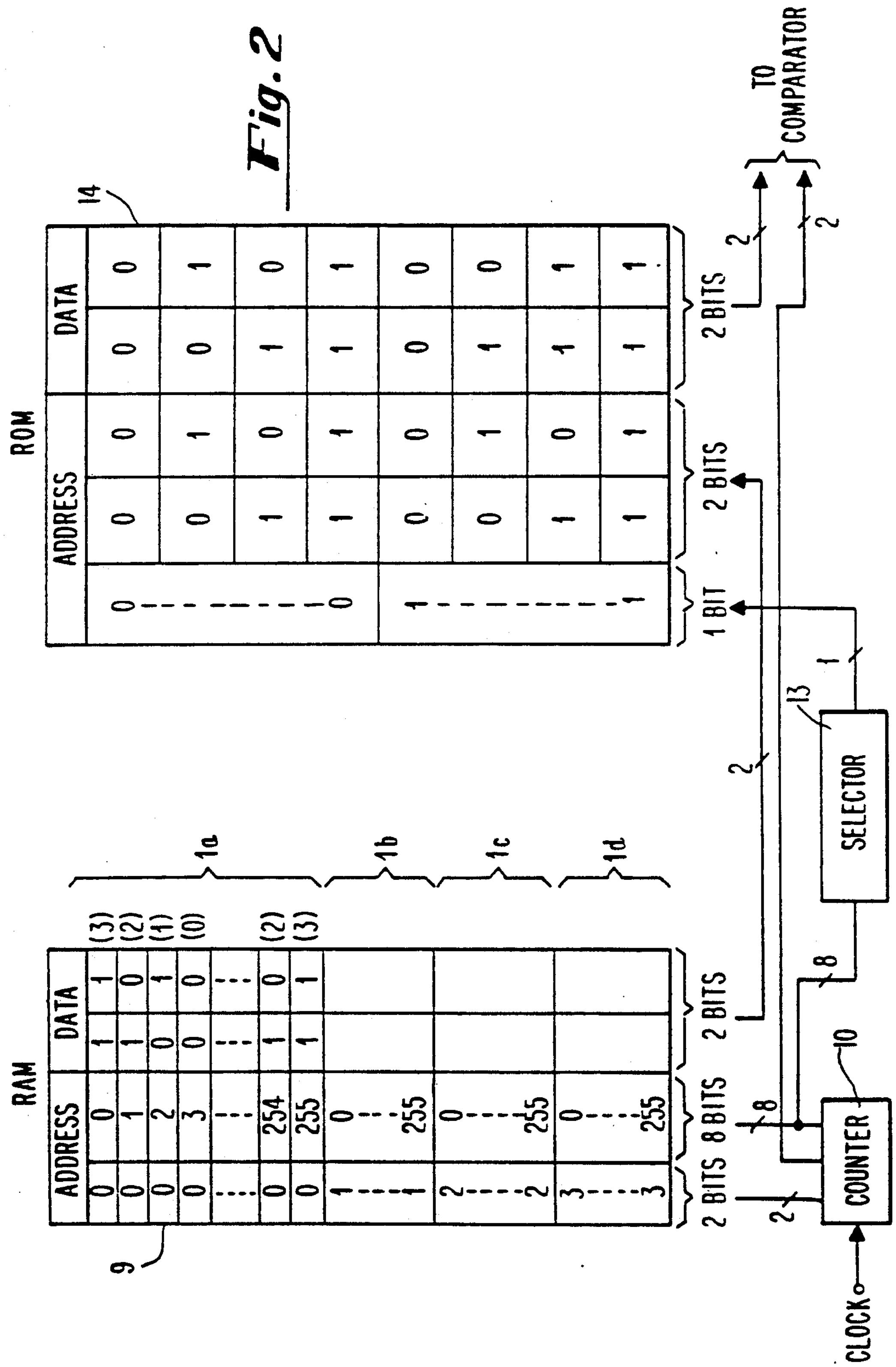
FIG. 2 is a diagram illustrating the operation of the apparatus of FIG. 1.

With reference to FIG. 2, the operation of the present apparatus will be described. In order to simplify the description, it is assumed that the multitone data stored in the RAM 9 are 2-bit data, and that N is 4 and M is 256, as with the afore-mentioned prior art apparatus. Namely, the apparatus has four heating element groups $1R_1$–$1R_4$ each of which consists of 256 heating elements $R_1$–$R_{256}$, and one line consists of 1024 pixels (or heating elements).

The multitone data corresponding to one line of 1024 heating elements are stored in sequence at addresses beginning from "0" in the RAM 9 in the same manner as in the prior art apparatus. The 256 data stored at addresses from "0" to "255" correspond to the heating element group $1R_1$, and the successive groups of 256 data correspond to the heating element groups $1R_2$, $1R_3$ and $1R_4$, respectively. The 5th to 12th bits of the output of the counter 10 are used for designating the 3rd to 10th bits of an address of the RAM 9 (in other words, for designating one of the heating elements $R_1$–$R_{256}$ of one of the heating element groups $1R_1$–$1R_4$). Hereinafter, the 5th to 12th bits of the output of the counter 10 are referred to as "the position data". The 1st and 2nd bits of the output of the counter 10 are used for designating the 1st and 2nd bits of an address of the RAM 9 (in other words, for designating one of the heating element groups $1R_1$–$1R_4$). The multitone data stored at the address which is designated by the combination of the 1st, 2nd and 5th to 12th bits of the output of the counter 10 are supplied sequentially to the comparator 11. The 3rd and 4th bits (threshold data) of the output of the counter 10 are directly supplied to the comparator 11. The multitone data (2 bits) designated by the 1st and 2nd and 5th to 12th bits of the output of the counter 10 is supplied to the least significant two bits (2nd and 3rd bits) of the address of the ROM 14.

The ROM 14 has 3-bit addresses and stores a conversion table for multitone data. More specifically, if the 1st bit of an address is "0", multitone data which is the same as the 2nd and 3rd bits of the address is stored at the address, and if the 1st bit of an address is "1", modified multitone data is stored at the address. As shown in FIG. 2, at the addresses "000", "001", "010" and 011, multitone data "00", "01", "10" and "11" are stored, respectively, and at the addresses "100", "101", "110" and "111", modified multitone data "00", "10", "11" and "11" are stored, respectively.

The selector 13 receives the 5th to 12th bits of the output of the counter 10 (i.e., the position data). When the position data is indicative of an address corresponding one of the intermediate heating elements $R_2$-$R_{255}$, the selector 13 outputs a signal of "0" to the 1st address bit of the ROM 14. In contrast, when the position data is indicative of an address corresponding to either of the end heating elements $R_1$ and $R_{256}$, the selector 13 outputs a signal of "1" to the 1st address bit of the ROM 14. As mentioned before, the 2-bit multitone data stored in the RAM 9 is supplied to the 2nd and 3rd address bits of the ROM 14. Therefore, when the output of the selector 13 is "0" (which indicates that an address corresponding to one of the intermediate heating elements $R_2$-$R_{255}$), the ROM 14 outputs the multitone data which is identical with the multitone data read out from the RAM 9. When the output of the selector 13 is "1" (which indicates that an address corresponding to either of the end heating elements $R_1$ and $R_{256}$ is designated in the RAM 9), the ROM 14 outputs one of the modified multitone data the address of which is designated by the combination of the output of the selector 13 and the original multitone data.

Figure 10:
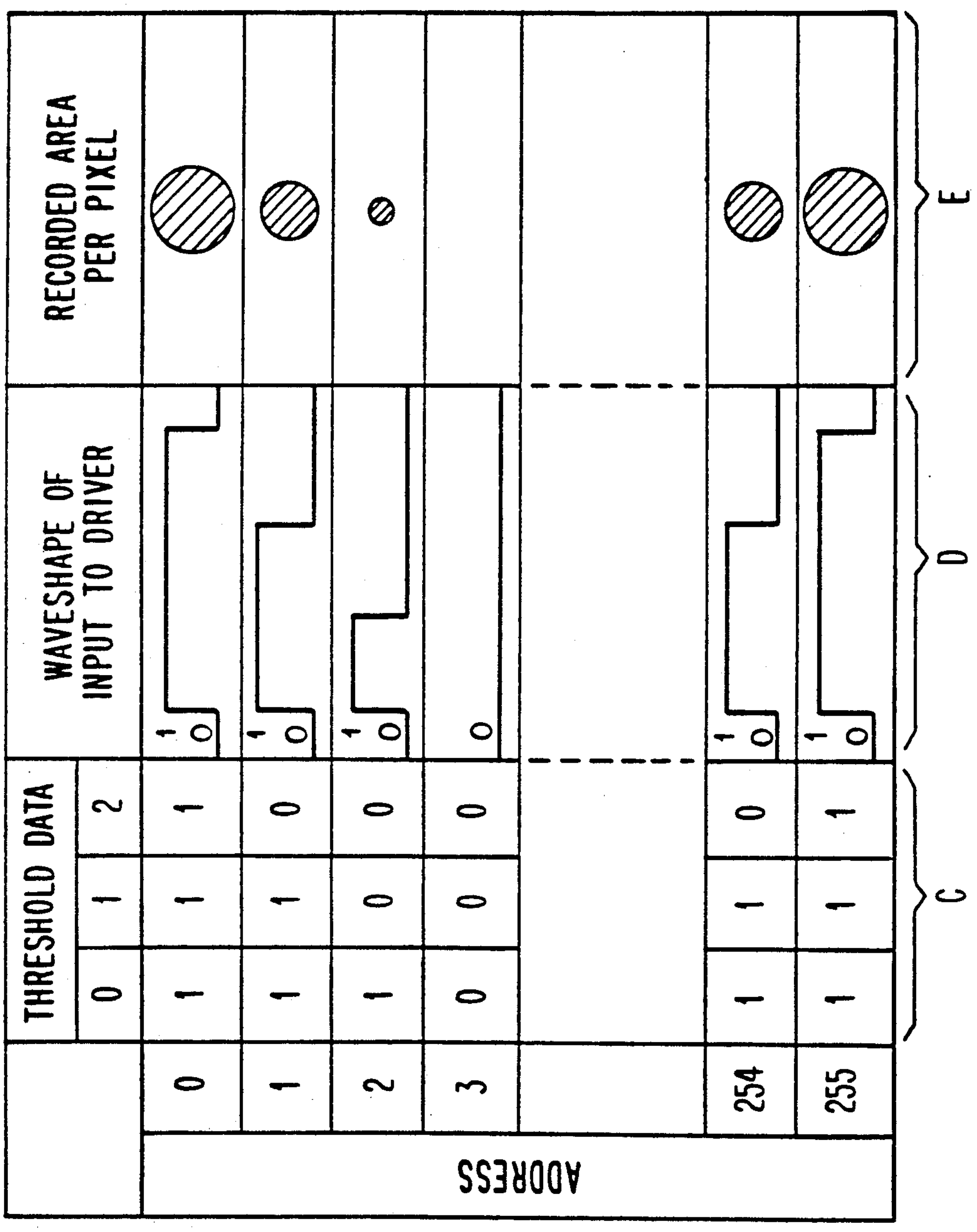
FIG. 10 is a diagram illustrating the relationship between multitone data and the size of a recorded area.
Figure 11:
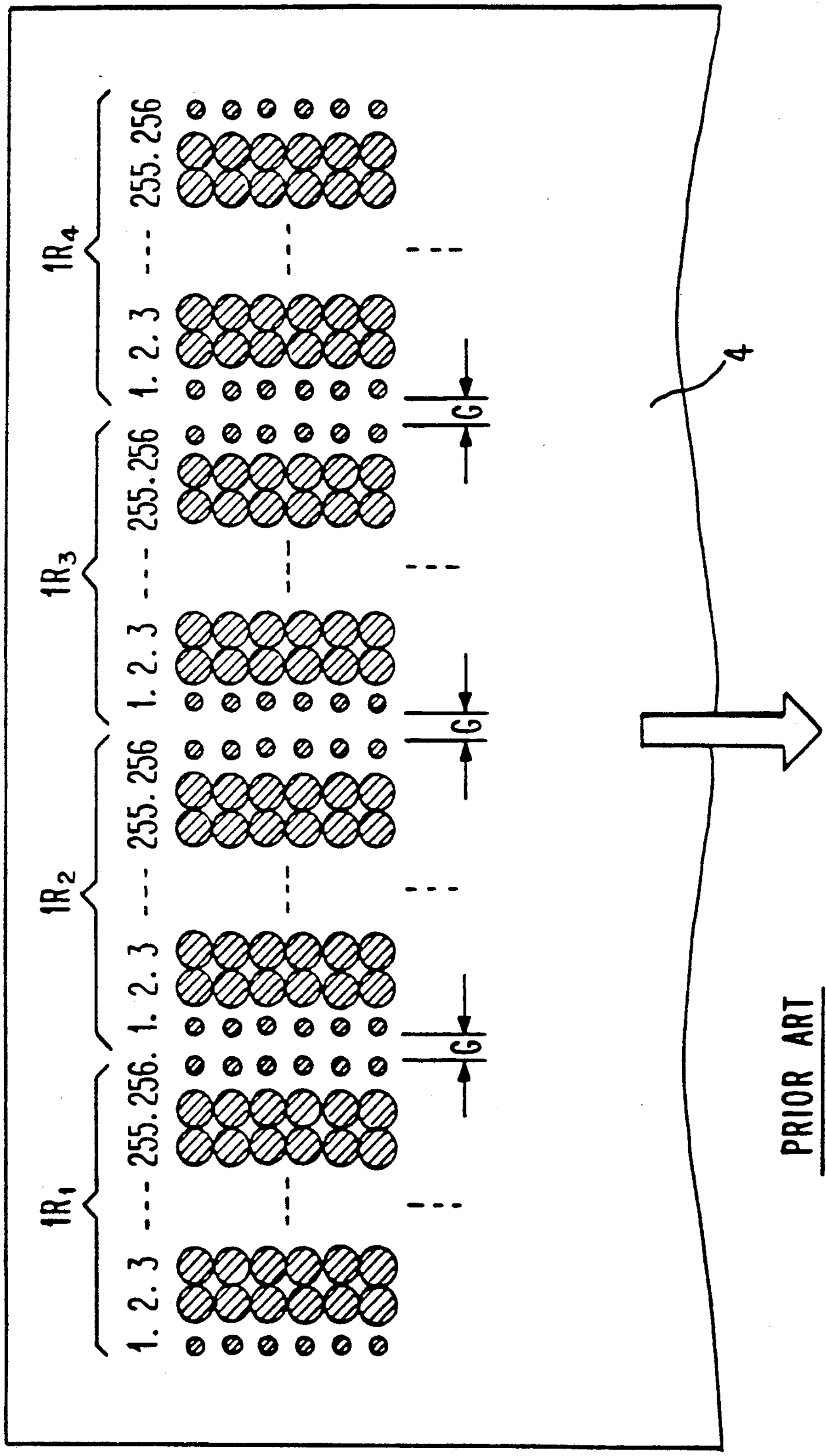
PRIOR ART Fig. 11
FIG. 11 shows an image printed by the apparatus of FIG. 8.

The output (multitone data or modified multitone data) of the ROM 14 is compared with the 3rd and 4th bits (threshold data) of the output of the counter 10 in the same manner as in the prior art apparatus, and, as shown in FIG. 10, pulses each of which has one of the 4-level widths corresponding to the output of the ROM 14 are supplied through the shift registers 8, latch circuits 7 and driver circuits 6 to the heating elements $R_1$-$R_{256}$ of the heating element groups 1$R_1$-1$R_4$.

Figure 3:
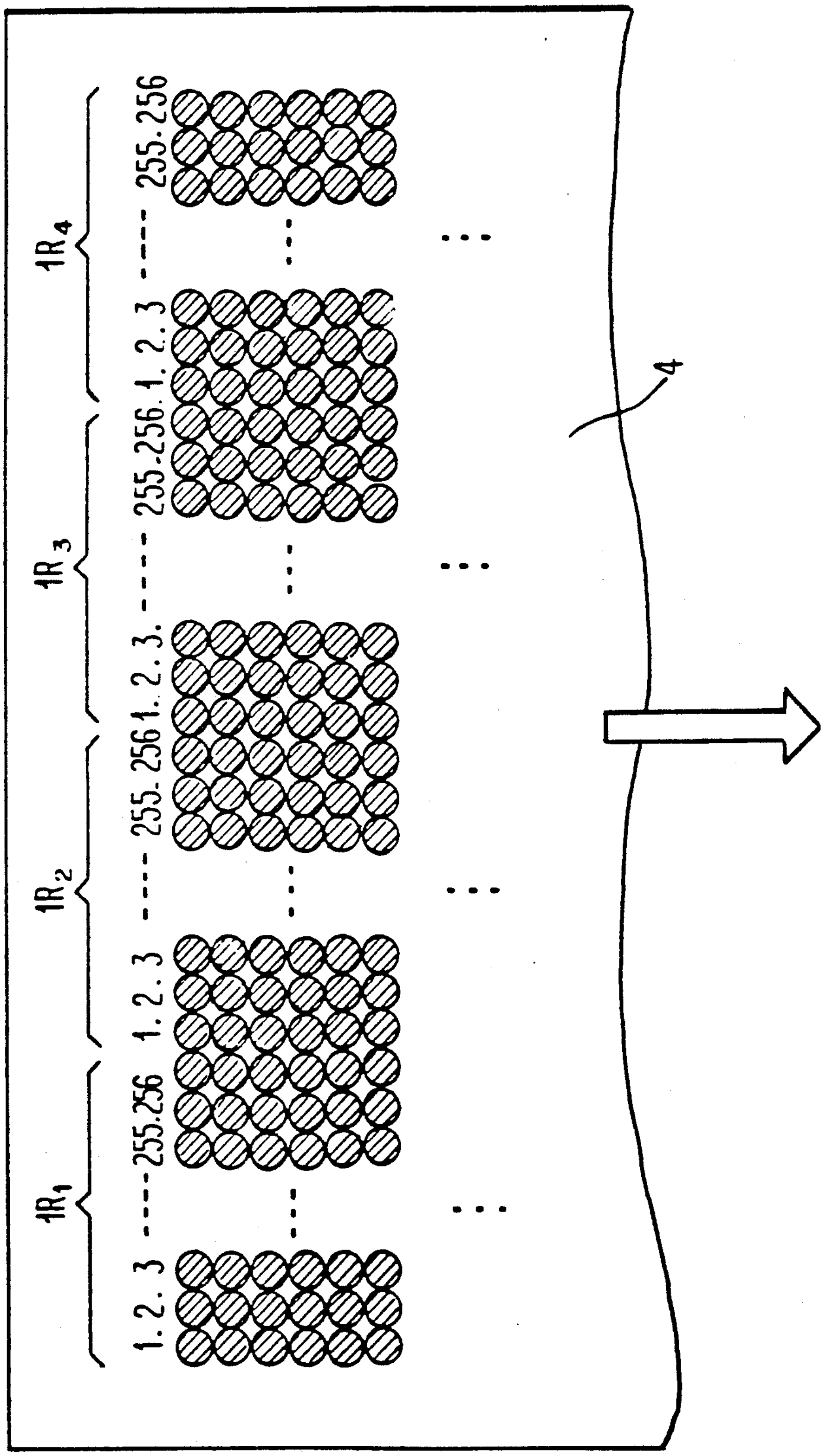
FIG. 3 shows an image printed by the apparatus of FIG. 1.

As described above, according to the embodiment, the multitone of the image data corresponding to the end heating elements of the heating element groups is increased in advance, whereby compensating by an amount of heat equivalent to the amount lacking in the end heating elements of the heating element group by which the intended recorded area per pixel cannot be recorded because of insufficient heat due to radiation of heat outside of the heating element group. Therefore, the end heating elements of heating element groups can record the same area as other heating elements in the heating element groups, thus solving the problem of forming printing gaps on the recording surface corresponding to the boundaries between the heating element groups, as shown in FIG. 3.

Figure 4:
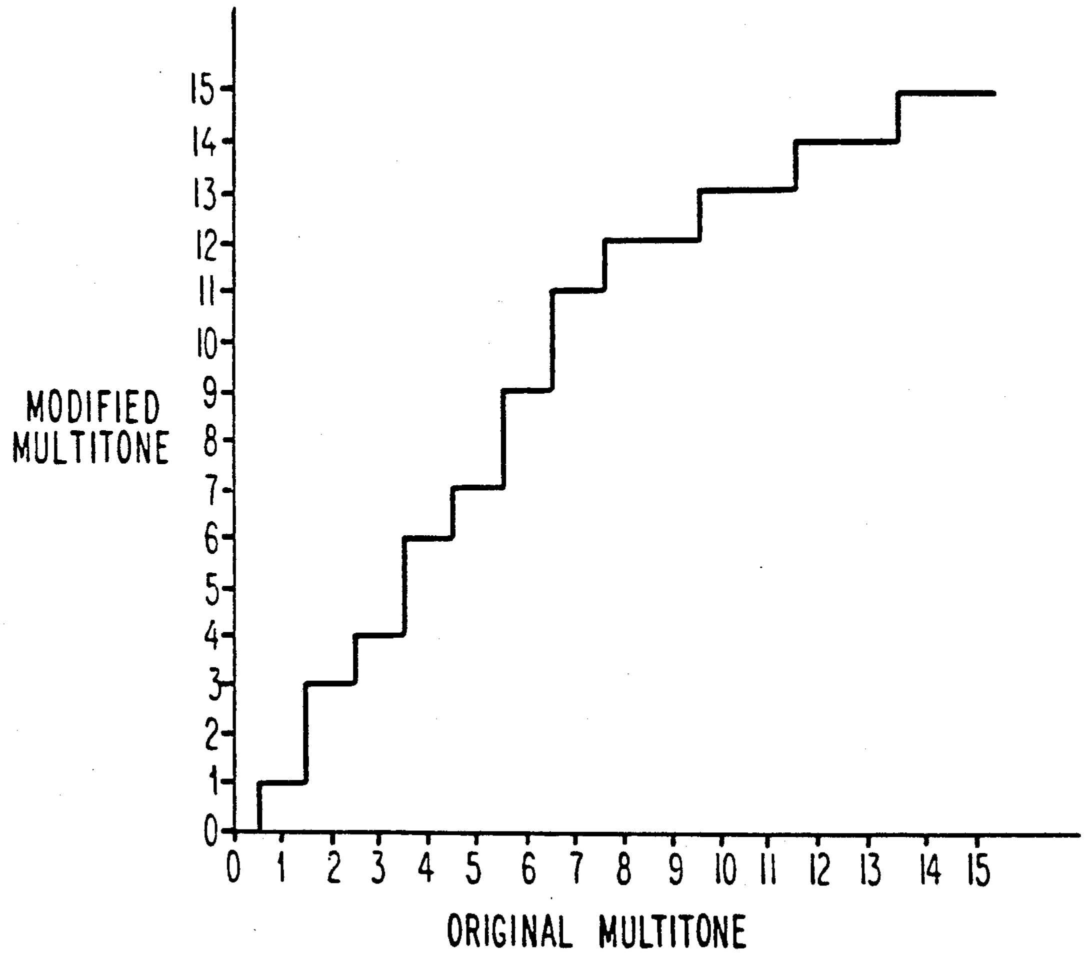
FIG. 4 is a graph showing a relation between multitone data and modified multitone data for them.
Figure 12:
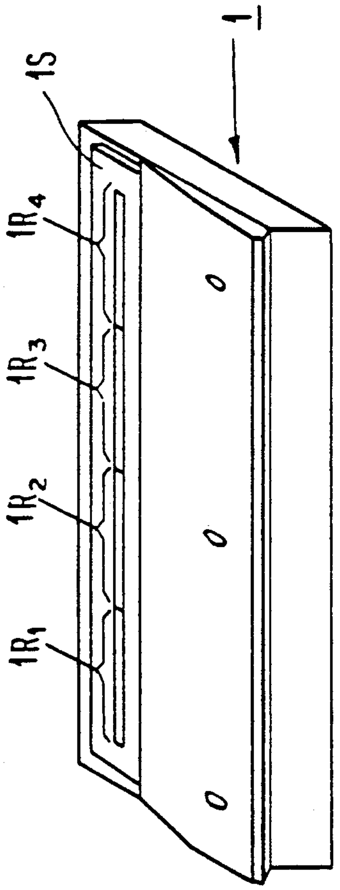
FIG. 12 is a perspective view of a thermal head.

For the sake of simplicity, a simple configuration has been described in the above in which the multitone data is 2-bit data and is increased by "1" only when the multitone data of the end heating elements is "01" or "10", but more precise compensation for higher fidelity printing can be performed by increasing the number of multitone data bits. Since printing gaps are most remarkable when intermediate multitones are printed, it is preferable that the degree of compensation is greatest in the intermediate multitone as shown in FIG. 4.

In the embodiment of FIG. 1, the multitone data is changed only for group end heating elements, but by increasing the number of bits output from the selector 13 and increasing the size of the ROM 14, the multitone data can be changed independently for the second or even the third heating elements from the end, and thereby compensation with greater precision can be achieved.

Further, the shape of the heating elements of the thermal head used in the embodiment is wider near the end portions and narrower near the midpoint, but the shape of the heating elements may be any desired shape.

Figure 5:
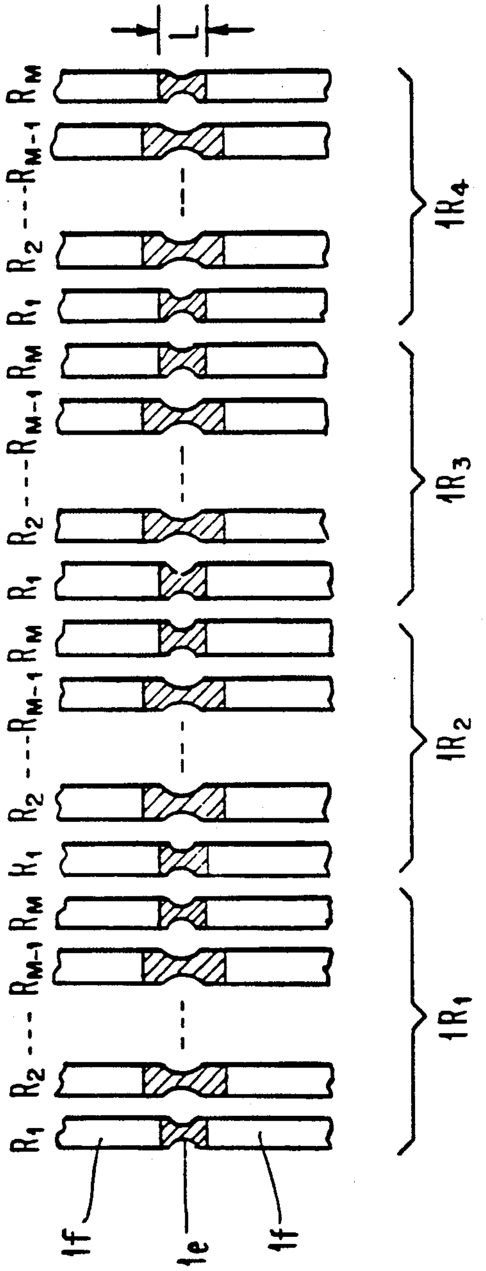
FIG. 5 shows thermal heating elements used in another apparatus according to the invention.

FIG. 5 shows thermal elements used in another thermal printing apparatus according to the invention. The 4M number of thermal elements are divided into four groups 1$R_1$-1$R_4$ in the same manner as those of the above-described apparatus. In each of the heating element groups 1$R_1$-1$R_4$ which are driven independently and sequentially as described above, the length L of the 1st and Mth heating elements $R_1$ and $R_M$ is shorter than that of the other heating elements $R_2$ to $R_{M-1}$. Since the resistance of the heating elements is in general proportional to the ratio of the length to the width, the resistance of the 1st and Mth heating elements $R_1$ and $R_M$ is smaller than that of the other heating elements $R_2$ to $R_{M-1}$, and therefore the amount of heat generated by the 1st and Mth heating elements $R_1$ and $R_M$ is greater than that generated by the other heating elements $R_2$ to $R_{M-1}$ when a voltage of the same level is applied.

The length L of the heating elements $R_1$ and $R_M$ is selected so that, when printing is performed by this M number of heating elements $R_1$ to $R_M$, the amount of heat generated by the 1st and Mth heating elements $R_1$ and $R_M$, which was insufficient in the prior art apparatus due to the escape of heat to the outside of the heating element group, is increased by an amount equal to the escaping amount. Consequently, the amount of heated generated by the 1st and Mth heating elements $R_1$ and $R_M$ approximates to that generated by the other heating elements $R_2$ to $R_{M-1}$. Further, by compensating the amount of heat generated by the 1st and Mth heating elements $R_1$ and $R_M$ by means of the signal circuit unit 12 shown in FIG. 1, the difference between the amount of heat generated by the 1st and Mth heating elements $R_1$ and $R_M$ and that generated by the other heating elements $R_2$ to $R_{M-1}$ is made small enough so as to be ignored. Therefore, all of the pixels corresponding to the heating elements $R_1$ and $R_M$ are recorded in the same size, thus eliminating the problem of printing gaps on the recording surface corresponding to the boundaries between heating element groups.

In this second embodiment, the absolute amount of compensation by the signal circuit unit 12 may be less than in the first embodiment, and hence more precise compensation becomes possible using the same signal circuit unit. In this second embodiment, the shape of the heating elements and the multitone data are changed only for the group end heating elements, but an even finer compensation becomes possible by independently changing the shape and multitone data for the second or even the third heating elements from the ends of each group. Further, the shape of the heating elements is wider near the terminal 1*f* and narrower near the midpoint, but the shape of the heating elements can be any desired shape.

In the above, thermal printing apparatuses using the thermal transfer ink sheet 3 and paper sheet 4 are described, but alternatively a combination of a dye diffusion thermal transfer sheet and a recording sheet, or thermal transfer sheet may be used.

As apparent from above description, printing gaps which occur on the recording surface at positions corresponding to the boundaries between the heating element groups can be eliminated, and a thermal recording apparatus capable of multitone recording with superior image quality is realized.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a thermal recording apparatus comprising: a thermal head including a plurality of heating element groups, each of said heating element groups comprising a plurality of heating elements which are driven simultaneously and arranged in a row, said plurality of heating elements including intermediate heating elements and end heating elements located at each end of the row; and a driving unit for producing driving signals indicative of tones reflecting pixel image data to drive said heating elements, said pixels corresponding respectively to said heating elements, said heating elements being driven for a period of time which is varied in accordance with the tones, said driving unit comprises a modification means for modifying the driving signals corresponding to at least one of said heating elements which is disposed at each of both ends of each of said heating element groups, such that a greater amount of heat is generated to the end heating elements and to the intermediate heating elements, and wherein a degree of modifying said period of time by said modification means depends on a level of the tone of said at least one of said heating elements such that the degree of modification in an intermediate tone region is greater than that for a low or a high tone region.

2. An apparatus according to claim 1, wherein each of said heating elements has a resistance which is highest at a center portion of each of said heating elements and gradually decreases in both directions from the center portion of each of the heating elements to terminal portions located on each end of each of said heating elements.

3. An apparatus according to claim 1, wherein said driving unit further comprises:

first memory means for storing tone data for said heating elements; and address means for producing address data indicative of addresses of said first memory means at which said tone data are stored, and said modification means comprises:

second memory means for storing modified tone data corresponding respectively to each degrees of tones; and selection means for receiving said address data, and for, when said received address data is not indicative of an address of said first memory means corresponding to said at least one of said heating elements, selecting the tone data stored at said address of said first memory means, and, when said received address data is indicative of an address of said first memory means corresponding to said at least one each of heating elements, selecting one of said modified tone data which corresponds to the tone data stored at the address of said first memory means which is indicated by said address data produced by said address means.

4. An apparatus according to claim 3, wherein said selection means receives a part of said address data.

5. An apparatus according to claim 1, wherein said at least one of said heating elements which is disposed at each of both ends of each of said heating element groups is different in at least one of shape and dimension from other heating elements.

6. An apparatus according to claim 1, wherein said driving unit further comprises:

first memory means for storing tone data for said heating elements; and address means for producing address data indicative of addresses of said first memory means at which said tone data are stored, and wherein said modification means comprises:

second memory means for storing modified tone data corresponding respectively to a plurality of degrees of tones, and unmodified tone data which are identical with the tone data stored in said first memory means; and selection means for receiving said address data, for selecting one of said unmodified tone data stored in the second memory which is identical with the tone data stored at the address of said first memory means which is indicated by said address data produced by said address means when said received address data is not indicative of an address of said first memory means corresponding to at least one of heating said elements, and for selecting one of said modified tone data which corresponds to the tone data stored at the address of said first memory means which is indicated by said address data produced by said address means when said received address data is indicative of an address of said first memory means corresponding to said at least of said heating elements.

7. In a thermal recording apparatus comprising: a thermal head including N number of heating element groups, each of said heating element groups comprising a plurality of heating elements which are driven simultaneously and are arranged in a row; N number of driver circuits for controlling currents flowing through said thermal head; N number of latch circuits disposed in correspondence with said driver circuits; and N number of shift registers disposed in correspondence with said latch circuits, said apparatus further comprises a control unit for supplying signals of printing data to said shift registers, for applying said currents in accordance with image data per pixel for a controlled period of time, said pixel corresponding to one of said heating elements, said image data having multiple tones, and for modifying a tone of the image data corresponding to at least one of said heating elements which is disposed at each of both ends of each of said heating element groups, such that a greater amount of heat is generated to the end heating elements than an intermediate heating elements and wherein a degree of modifying said period of time by said modification means depends on a level of the tone of said at least one of said heating elements such that the degree of modification in an intermediate tone region is greater than that for a low tone region or a high tone region.

8. An apparatus according to claim 7, wherein said at least one of said heating elements which is disposed at each of both ends of each of said heating element groups is different in at least one of the shape and dimension from other heating elements.

* * * * *